(12) United States Patent
Shogaki

(10) Patent No.: US 11,843,745 B2
(45) Date of Patent: Dec. 12, 2023

(54) INFORMATION PROCESSING APPARATUS FOR READOUT OF DATA COMPRESSED IN A MOUNT FORMAT

(71) Applicant: CANON KABUSHIKI KAISHA, Tokyo (JP)

(72) Inventor: Yohei Shogaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/517,243

(22) Filed: Nov. 2, 2021

(65) Prior Publication Data
US 2022/0150365 A1 May 12, 2022

(30) Foreign Application Priority Data
Nov. 6, 2020 (JP) .................................. 2020-185941

(51) Int. Cl.
*G06K 15/00* (2006.01)
*H04N 1/00* (2006.01)

(52) U.S. Cl.
CPC ... *H04N 1/0097* (2013.01); *H04N 2201/0094* (2013.01)

(58) Field of Classification Search
CPC ..................... H04N 1/0097; H04N 2201/0094
USPC ................................. 358/1.16, 1.15, 1.13, 1.1
See application file for complete search history.

(56) References Cited

U.S. PATENT DOCUMENTS

| 8,972,358 | B2* | 3/2015 | Yamakawa | G06F 3/0661 711/158 |
| 2007/0064556 | A1* | 3/2007 | Taneoka | H04N 5/772 369/47.1 |
| 2014/0201175 | A1* | 7/2014 | Ohno | G06F 16/1744 707/693 |
| 2017/0039000 | A1* | 2/2017 | Feng | G06F 3/0638 |
| 2019/0121549 | A1* | 4/2019 | Satoyama | G06F 3/0688 |
| 2021/0409037 | A1* | 12/2021 | Chuggani | H03M 7/6005 |

FOREIGN PATENT DOCUMENTS

JP 2007048221 A 2/2007

* cited by examiner

*Primary Examiner* — Dung D Tran
(74) *Attorney, Agent, or Firm* — Canon U.S.A., Inc. IP Division

(57) ABSTRACT

There is provided an information processing apparatus that enables readout of data compressed in a mount format. An information processing apparatus includes a mount unit configured to mount compressed data, a decompression unit configured to decompress a compressed file having access information to access the data mounted by the mount unit, and a readout unit configured to read out the mounted data by reading out the file decompressed by the decompression unit.

10 Claims, 4 Drawing Sheets

INFORMATION PROCESSING APPARATUS FOR READOUT OF DATA COMPRESSED IN A MOUNT FORMAT

BACKGROUND

Field of the Disclosure

The present disclosure relates to an information processing apparatus, an information processing method, and a storage medium.

Description of the Related Art

It is desirable for an information processing apparatus to have a small storage capacity in order to reduce a sales cost. There is an information processing apparatus that compresses display data, and decompresses and uses the compressed display data as necessary in order to reduce the storage capacity (e.g., see Japanese Patent Application Laid-Open No. 2007-48221). In Japanese Patent Application Laid-Open No. 2007-48221, however, only one data compression format is described, and a configuration supporting a plurality of data compression formats is not considered.

SUMMARY

The present disclosure is directed to readout of data compressed in a mount format. According to an aspect of the present disclosure, an information processing apparatus includes a mount unit configured to mount compressed data, a decompression unit configured to decompress a compressed file having access information to access the data mounted by the mount unit, and a readout unit configured to read out the mounted data by reading out the file decompressed by the decompression unit.

Further features of the present disclosure will become apparent from the following description of exemplary embodiments with reference to the attached drawings.

DESCRIPTION OF THE EMBODIMENTS

An exemplary embodiment of the present disclosure is described below with reference to drawings. The following exemplary embodiment does not limit the disclosure recited in the claims, and all of combinations of features described in the exemplary embodiment are not necessarily essential for solving means of the disclosure.

Figure 1:
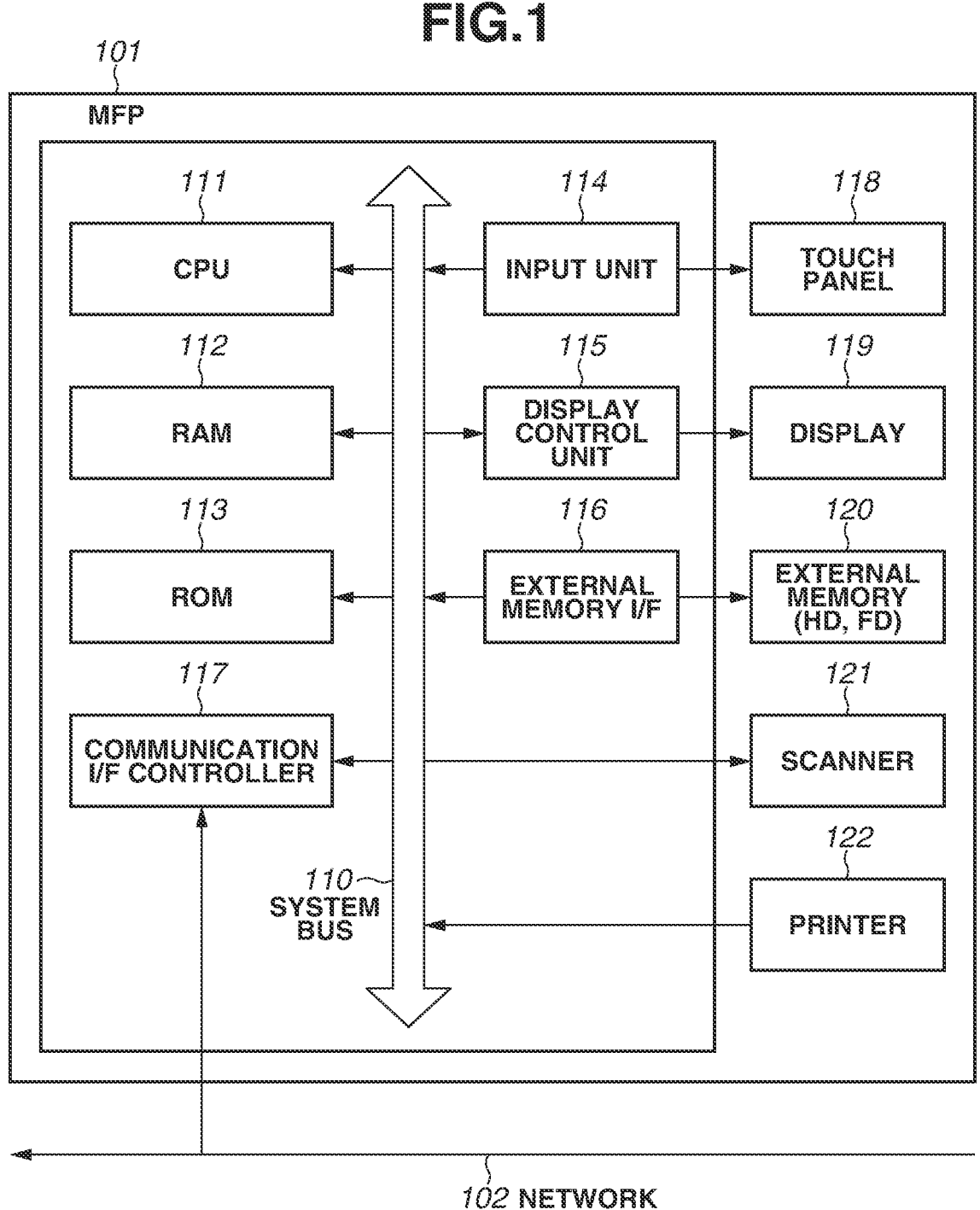
FIG. 1 is a diagram illustrating a hardware configuration example of an information processing apparatus.

FIG. 1 is a diagram illustrating a hardware configuration example of an information processing apparatus according to the present exemplary embodiment. In FIG. 1, a multi-functional peripheral (MFP) 101 is described as an example of the information processing apparatus. The MFP 101 is connected to a network 102, and includes a system bus 110, a central processing unit (CPU) 111, a random access memory (RAM) 112, a read only memory (ROM) 113, an input unit 114, a display control unit 115, an external memory interface (I/F) 116, and a communication I/F controller 117. The MFP 101 further includes a touch panel 118, a display 119, an external memory 120, a scanner 121, and a printer 122.

The CPU 111, the RAM 112, the ROM 113, the input unit 114, the display control unit 115, the external memory I/F 116, and the communication I/F controller 117 are connected to the system bus 110. The touch panel 118 is connected to the system bus 110 through the input unit 114. The display 119 is connected to the system bus 110 through the display control unit 115. The external memory 120 is connected to the system bus 110 through the external memory I/F 116. The scanner 121 and the printer 122 are connected to the system bus 110. The processing units can mutually exchange data through the system bus 110.

The ROM 113 is a nonvolatile memory, and is used as a storage area storing image data, language data, and other data, various kinds of programs to be executed by the CPU 111, and the like in predetermined areas. The RAM 112 is a volatile memory, and is used as a main memory for the CPU 111 and a temporary storage area such as a work area. For example, the CPU 111 uses the RAM 112 as a work memory and controls the units of the MFP 101 based on the programs stored in the ROM 113. The programs to be executed by the CPU 111 may be previously stored not only in the ROM 113 but also in a storage area of the external memory (such as hard disk) 120.

The input unit 114 receives user operation, generates a control signal corresponding to the operation, and supplies the control signal to the CPU 111. For example, the input unit 114 receives the user operation from a keyboard (not illustrated), a mouse (not illustrated), and the touch panel 118 each functioning as an input device. The touch panel 118 is an input device that outputs, for example, coordinate information corresponding to a touched position of an input unit configured in a planar shape. The CPU 111 controls the units of the MFP 101 by following the programs based on the control signal that is generated by the input unit 114 in response to the user operation on the input device and is supplied from the input unit 114. As a result, the MFP 101 can perform operation corresponding to the user operation.

The display control unit 115 outputs a display signal for image display to the display 119. For example, the CPU 111 supplies a display control signal generated based on a program to the display control unit 115. The display control unit 115 generates the display signal based on the display control signal, and outputs the display signal to the display 119. For example, the display control unit 115 causes the display 119 to display a graphical user interface (GUI) screen configuring GUI based on the display control signal generated by the CPU 111.

The touch panel 118 is configured integrally with the display 119 and also functions as an operation unit. For example, a manufacturer configures the touch panel 118 to have light transmittance not inhibiting display of the display 119, and attaches the touch panel 118 on an upper layer of a display surface of the display 119. Further, the manufacturer correlates an input coordinate on the touch panel 118 to a display coordinate on the display 119. As a result, the GUI enabling the user to directly operate the screen displayed on the display 119 is configured.

The external memory 120 is attachable to the external memory I/F 116. The external memory I/F 116 reads out data from the attached external memory 120 and writes data in the external memory 120 under the control of the CPU 111.

Examples of the external memory 120 include a hard disk, a flexible disk, a compact disc (CD), a digital versatile disc (DVD), and a memory card.

The communication DF controller 117 performs communication with various kinds of network 102 such as a local area network (LAN), the Internet, a wired network, and a wireless network, under the control of the CPU 111. Various apparatuses such as a personal computer (PC), other MFPs, a printer, and a server are connected to the network 102 to be communicable with the MFP 101.

The scanner 121 reads a document and generates image data. The printer 122 performs printing processing based on a user instruction input through the input unit 114 and a command input from an external apparatus through the communication L/F controller 117.

Next, a language resource compression/readout function of the MFP 101 is described. In the present exemplary embodiment, the language resource compression/readout function is a function to compress a language resource and locates the compressed language resource in a storage area such as the ROM 113 or the external memory 120, and to read out the language resource.

As a method of reading out compressed data such as a language resource, a method in which the compressed data is decompressed in another area of the storage area and the decompressed data is read out has been known. Further, as another method, a method in which the compressed data is read out as it is without decompressing the compressed data by mounting the compressed data has been known. As a compressed read-only file system in the latter case, for example, SquashFS for Linux has been known.

The CPU 111 has a function to generate a display screen by using a language resource and to display the display screen on the display 119. The display screen of the MFP 101 includes an image and a character string, and the CPU 111 has a function to display the character string by switching the character string to a plurality of languages. The CPU 111 holds language resources of a plurality of languages in the storage area, reads the language resource at a necessary timing, generates the display screen, and displays the display screen on the display 119.

Figure 2:
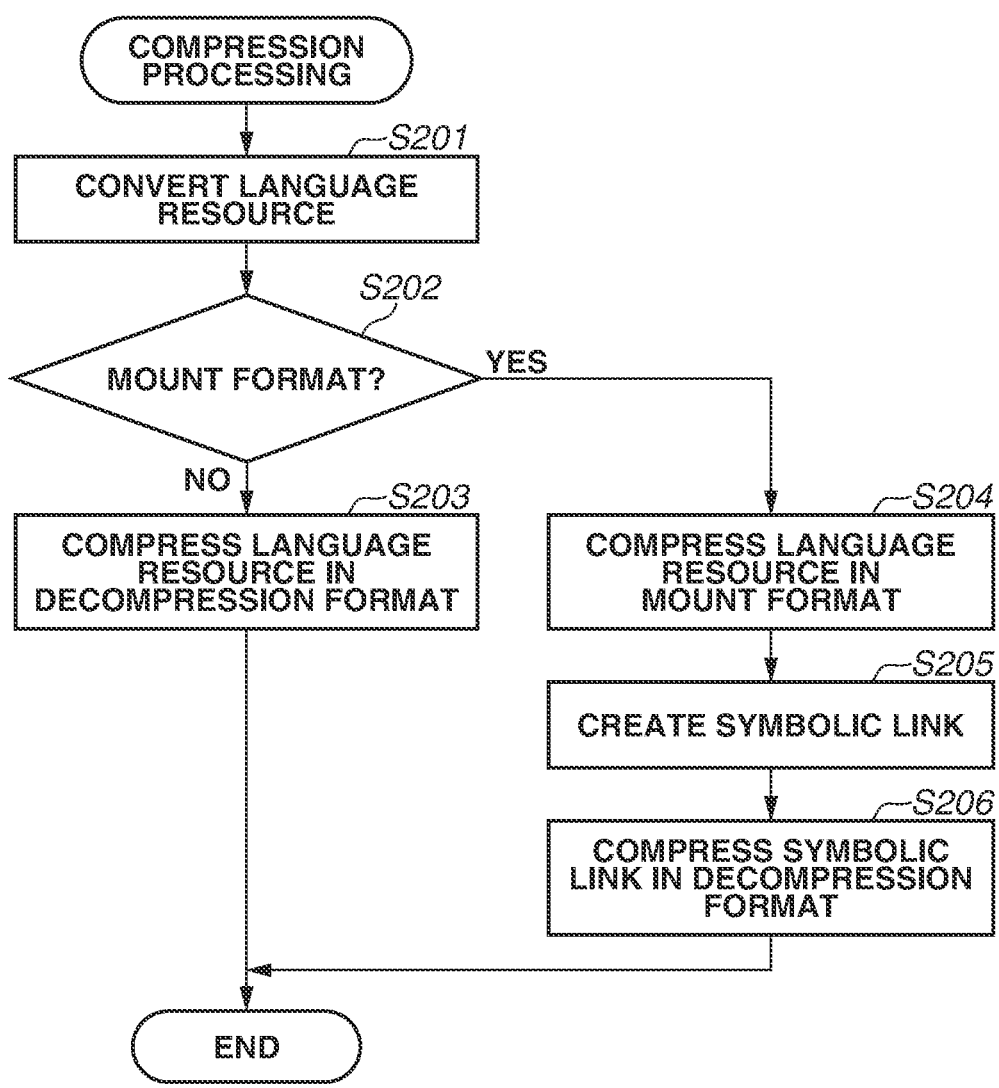
FIG. 2 is a flowchart illustrating processing to compress a language resource.

FIG. 2 is a flowchart illustrating a series of processes by the CPU 111 to compress the language resource. Each of steps in FIG. 2 is processed when the CPU 111 of the MFP 101 executes a program. The program to be executed is stored in the memories such as the ROM 113 and the external memory 120, and is executed after being loaded to the RAM 112. The language resource is an example of data. An information processing method by the MFP 101 is described below.

In step S201, the CPU 111 converts the language resource into a description format of a property file. The property file is a file in which various kinds of settings used by the program are described. The description format of the property file indicates a format in which the settings are each described in a form of "property name=value". Converting the language resource into the format of the property file facilitates handling of the language resource when the language resource is used for screen display.

In step S202, the CPU 111 determines, by determination processing of a determination unit, whether to compress the language resource in a mount format. In a case where the CPU 111 determines not to compress the language resource in the mount format (NO in step S202), the processing proceeds to step S203. In a case where the CPU 111 determines to compress the language resource in the mount format (YES in step S202), the processing proceeds to step S204. To compress data in the mount format means to compress data in a format enabling the data to be read by being mounted when the compressed data is read. More specifically, the CPU 111 determines from a file name passed to the compression processing whether the processing is performed in the mount format. When performing the series of compression processes, the CPU 111 reads out a file information record file in which files to be compressed, held in the storage area are described in a list format. The CPU 111 specifies a file to be compressed from the read file information record file. The CPU 111 reads out a file name from the file information record file, and determines whether the file name includes specific characters that are ruled to be described as the file name for compression in the mount format. In a case where the file name includes the specific characters, the CPU 111 determines to compress the file to be compressed, in the mount format. In a case where the file name does not include the specific characters, the CPU 111 determines not to compress the file to be compressed, in the mount format. More specifically, in a case where the file name includes a character string "sfs", the CPU 111 determines to perform the processing in the mount format.

In step S203, the CPU 111 compresses the language resource in a decompression format. The processing then ends. More specifically, the CPU 111 performs processing to compress the file to be compressed, instructed by the file information record file, in the decompression format. To compress data in the decompression format means to compress data in a format enabling the data to be read by being decompressed when the compressed data is read.

In step S204, the CPU 111 compresses the language resource in the mount format. More specifically, the CPU 111 performs processing to compress the file to be compressed, instructed by the file information record file, in the mount format.

In step S205, the CPU 111 creates a symbolic link. The symbolic link is set as a link to a mount destination described below. The symbolic link is created to have the same file name as the language resource converted and created in step S201. As a result, the CPU 111 can perform language resource readout processing described below by common processing.

In step S206, the CPU 111 compresses the created symbolic link in the decompression format. The processing then ends.

Figure 3:
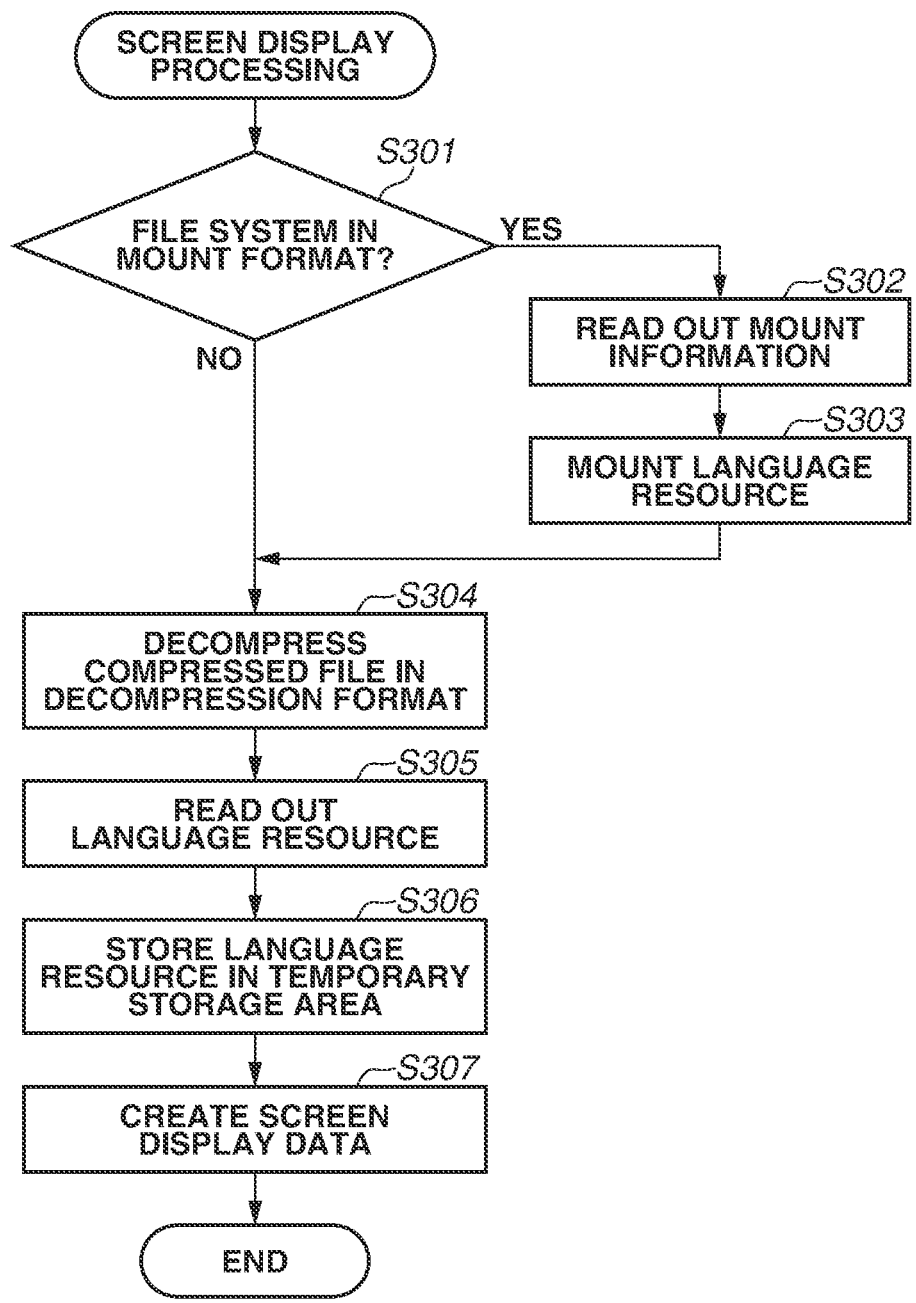
FIG. 3 is a flowchart illustrating processing to readout the language resource and to display a screen.

FIG. 3 is a flowchart illustrating a series of processes by the CPU 111 to read out the language resource and to display a screen on the display 119. Each of steps in FIG. 3 is processed when the CPU 111 of the MFP 101 executes a program. The program to be executed is stored in the memories such as the ROM 113 and the external memory 120, and is executed after being loaded to the RAM 112.

In step S301, the CPU 111 determines, by determination processing of the determination unit, whether the language resource is a file system compressed in the mount format. In a case where the language resource is the file system compressed in the mount format (YES in step S301), the processing proceeds to step S302. In a case where the language resource is not the file system compressed in the mount format (NO in step S301), the processing proceeds to step S304. It is determined whether the language resource is the file system compressed in the mount format, based on whether a mount information file described below is present in the storage area. In a case where the mount information file is present in the storage area, the CPU 111 determines that the language resource is the file system compressed in the mount format. In a case where the mount information file is not present in the storage area, the CPU 111 determines that the language resource is not the file system compressed in the mount format. The method in which the CPU 111 determines the file system based on presence/absence of the mount information file is described; however, the method is not limited thereto. The present exemplary embodiment is applicable to a configuration in which information representing that the language resource is the file system compressed in the mount format is previously recorded in the storage area.

In step S302, the CPU 111 reads out the mount information file stored in the storage area. In the mount information file, a mount source file and information on a mount destination directory are described. The CPU 111 acquires information representing that which file is mounted to which directory, based on the mount information file. The mount source file is the compressed language resource, and a file path where the compressed language resource is located and the file name are described in the mount source file.

In step S303, the CPU 111 mounts the language resource on the mount destination directory. When the CPU 111 mounts the language resource, the CPU 111 can access the language resource in a state where contents of the compressed language resource are visible, by accessing the mount destination directory.

In step S304, the CPU 111 decompresses the file compressed in the decompression format. More specifically, the CPU 111 locates, on a specific path, the decompressed data that is obtained by decompressing the data compressed in the decompression format located on the specific path. In a case where the language resource is compressed in the decompression format, the content of the file compressed in the decompression format located on the specific path is the language resource. Therefore, the language resource is located on the specific path. In contrast, in a case where the language resource is compressed in the mount format, the content of the file compressed in the decompression format located on the specific path is not the language resource but the above-described symbolic link. Therefore, the symbolic link is located on the specific path.

In step S305, the CPU 111 reads out the language resource from the specific path where the decompressed data is located. In a case where the language resource is located, the CPU 111 reads out the language resource as it is. In a case where not the language resource but the symbolic link is located, the CPU 111 reads out the link destination of the symbolic link. The mount destination directory is designated as the link destination of the symbolic link. The content of the compressed language resource is mounted in an accessible state in the mount destination directory. In other words, the CPU 111 reads out the language resource by dereferencing the symbolic link and the mount destination directory.

In step S306, the CPU 111 stores the read language resource in a temporary storage area. In step S307, the CPU 111 creates screen display data by using the language resource stored in the temporary storage area, and displays the screen display data on the screen. The processing then ends. The CPU 111 reads out the language resource in the format of the property file, stored in the temporary storage area when performing the screen display. Further, the CPU 111 creates the screen display data to be displayed on the display 119 by using information on the read language resource. Thereafter, the CPU 111 displays the created screen display data on the display 119.

Figure 4:
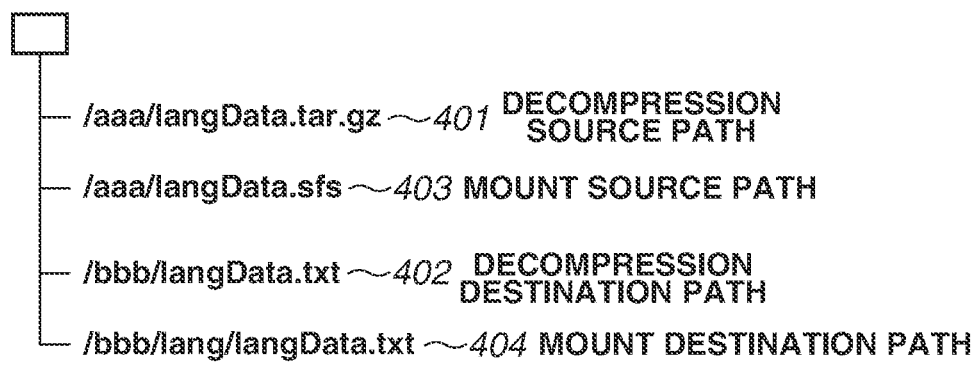
FIG. 4 is a diagram illustrating a configuration example of a directory.

FIG. 4 is a diagram illustrating a configuration example of a directory in which files each including the language resource are located. An example in which the series of language resource readout processes described above is performed is described with reference to FIG. 4.

First, the case where the language resource is not compressed in the mount format is described. In step S203, the CPU 111 compresses the language resource in the decompression format by compression processing of a compression unit, to generate a compressed file, and locates the compressed file as a decompression-format compressed file on a decompression source path 401. In step S304, the CPU 111 acquires the file of the language resource by decompressing the decompression-format compressed file on the decompression source path 401 by decompression processing of a decompression unit, and locates the acquired file of the language resource on a decompression destination path 402. In this case, the decompressed file of the language resource is located on the decompression destination path 402. In step S305, the CPU 111 performs processing to read out the file of the language resource located on the decompression destination path 402 by the language resource readout processing. In this case, since a substance of the language resource is located on the decompression destination path 402, the CPU 111 directly reads out the language resource. In step S306, the CPU 111 stores the read language resource in the temporary storage area, and performs subsequent processing. Since the CPU 111 does not compress the language resource in the mount format, no file exists on a mount source path 403 and a mount destination path 404.

Next, the case where the language resource is compressed in the mount format is described. In step S204, the CPU 111 compresses the language resource in the mount format by compression processing of the compression unit, to generate a compressed file, and locates the compressed file as a mount-format compressed file on the mount source path 403. In step S206, the CPU 111 compresses the file having the symbolic link in the decompression format by the compression processing of the compression unit, and locates the compressed file as a decompression-format compressed file on the decompression source path 401. The symbolic link is access information to access the mounted data. In step S301, the CPU 111 determines, by the determination processing of the determination unit, whether the file on the decompression source path 401 is in the mount format. In a case where the file is in the mount format, the processing proceeds to step S302. In a case where the file is not in the mount format, the processing proceeds to step S304. In step S303, the CPU 111 mounts the mount-format compressed file on the mount source path 403, on the mount destination path 404 by mount processing of a mount unit. In step S304, the CPU 111 acquires the file having the symbolic link by decompressing the decompression-format compressed file on the decompression source path 401 by decompression processing of the decompression unit, and locates the acquired file having the symbolic link on the decompression destination path 402. In this case, the file of the symbolic link having link information to the mount destination path 404 is located on the decompression destination path 402. The decompression-format compressed file has the file name same as the file name in the case where the language resource is not compressed in the mount format. Therefore, the common (same) decompression processing is performed in the case where it is determined in step S301 that the file is not in the mount format and in the case where it is determined in step S301 that the file is in the mount format. In other words, the common processing can be applied to the case where the language resource is not compressed in the mount format and the case where the language resource is compressed in the mount format. In step S305, the CPU 111 reads out the mounted language resource by reading out the file having the symbolic link located on the decompression destination path 402 by readout processing of a readout unit. In this case, in place of the file of the language resource, the file of the symbolic link having the same name is located on the decompression destination path 402. Therefore, the CPU 111 reads out the file at the link destination of the symbolic link by the system. The symbolic link is information to access data on the mount destination path 404. The mount destination path 404 is designated as the link destination of the symbolic link. It seems like the compressed language resource located on the mount source path 403 is located on the mount destination path 404 in a state of being decompressed by the system. Therefore, the CPU 111 further reads out the file at the mount source by the system. As a result, the CPU 111 indirectly reads out the language resource to the substance of the language resource as the mount source file. The file on the decompression destination path 402 has the file name same as the file name in the case where the language resource is not compressed in the mount format. Therefore, the common (same) readout processing is performed in the case where it is determined in step S301 that the file is in the mount format and in the case where it is determined in step S301 that the file is not in the mount format. In other words, the CPU 111 can apply the common processing to the case where the language resource is not compressed in the mount format and the case where the language resource is compressed in the mount format. In step S306, the CPU 111 stores the read language resource in the temporary storage area, and performs subsequent processing.

As described above, according to the present exemplary embodiment, the MFP 101 can realize the configuration further suppressing the storage capacity in the file system supporting the mount format. In other words, the MFP 101 can suppress a use amount of the storage capacity by mounting the language resource without using the storage capacity for the decompressed file in the case where the file is decompressed. Further, the MFP 101 compresses the language resource in the different compression formats in the file system not supporting the mount format and the file system supporting the mount format. Even in the different compression formats, the MFP 101 can perform the screen display processing by using the common decompression processing and the common readout processing. This improves development efficiency.

Further, the MFP 101 prepares the symbolic link and sets the link to the mount destination path 404, thereby achieving a plurality of effects. One of the effects is that, even when the mount destination path 404 is changed, it is only necessary to change the link destination of the symbolic link without changing the language resource readout processing. The mounting has a mechanism that, in a case where another file is already located on the mount destination path 404, the file is deleted in the mounting. If the mount destination path 404 is designated to the directory same as the decompression destination path 402, a file used for another application, located on the decompression destination path 402 is deleted. Therefore, the symbolic link is linked after the mount destination path 404 is set to a directory different from the directory of the decompression destination path 402. As a result, the other file located on the decompression destination path 402 can be used without being changed from the existing configuration. Further, configuring the symbolic link makes it possible to reduce the file size and to suppress the storage capacity.

According to the present exemplary embodiment, the language resource compression/readout processing can be realized and the decompression processing can be made common in consideration of the plurality of compression formats while the storage capacity is reduced.

In the description of the above-described exemplary embodiment, the MFP 101 is described as an example of the apparatus implementing the present disclosure; however, the apparatus implementing the present disclosure is not limited to the MFP. In other words, the present disclosure is applicable not only to the MFP but also to an image forming apparatus such as a printing apparatus, a scanner, a facsimile (FAX), or a digital camera or an information processing apparatus such as a PC or a portable information terminal.

Further, in the description of the above-described exemplary embodiment, an example in which one language resource is processed is described; however, the method to implement the present disclosure is not limited thereto. In other words, the present disclosure is applicable to a configuration in which different language resources are prepared for respective languages and respective countries.

Further, in the description of the above-described exemplary embodiment, the configuration in which it is determined whether to compress the file in the mount format, based on the file name is described as an example; however, the method to implement the present disclosure is not limited thereto. In other words, the present disclosure is applicable to a configuration in which information defining a compression format is acquired and the determination is performed based on the information, or a configuration in which the determination is performed with reference to information on a file system.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-185941, filed Nov. 6, 2020, which is hereby incorporated by reference herein in its entirety.

What is claimed is:

1. An information processing apparatus, comprising:
at least one processor; and
a memory that stores a program which, when executed by the at least one processor, causes the at least one processor to function as:
a determination unit configured to determine whether compressed data is a file system compressed in a mount format;
a mount unit configured to mount compressed data to make the compressed data readable without decompressing the compressed data in a case where the determination unit determines that the compressed data is the file system compressed in the mount format;
a decompression unit configured to decompress a compressed file having access information to access the compressed data mounted by the mount unit; and
a readout unit configured to read out the mounted compressed data using the access information of the file decompressed by the decompression unit.

2. The information processing apparatus according to claim 1, wherein the at least one processor further functions as:
a first compression unit configured to compress data in a first format to generate a compressed file; and
a second compression unit configured to compress, in a second format, a file having access information to access the mounted data,
wherein the mount unit mounts the file compressed by the first compression unit, and
wherein the decompression unit decompresses the file compressed by the second compression unit.

3. The information processing apparatus according to claim 2,
wherein the first format is a mount format, and
wherein the second format is a decompression format.

4. The information processing apparatus according to claim 3, wherein
the determination unit is configured to determine whether to compress data in the first format;
a third compression unit configured to, in a case where the determination unit determines not to compress data in the first format, compress data in the decompression format to generate a compressed file; and
a second determination unit configured to determine whether the file compressed in the decompression format is a file in the mount format,
wherein, in a case where the determination unit determines to compress data in the first format, the first compression unit compresses data in the mount format to generate a compressed file,
wherein, in the case where the determination unit determines to compress data in the first format, the second compression unit compresses the file having the access information, in the decompression format,
wherein, in a case where the second determination unit determines that the file is in the mount format, the mount unit mounts the file compressed by the first compression unit,
wherein, in a case where the second determination unit determines that the file is not in the mount format, the decompression unit decompresses the file compressed by the third compression unit, and in the case where the second determination unit determines that the file is not in the mount format, the decompression unit decompresses the file compressed by the second compression unit by processing common to the processing to decompress the file compressed by the third compression unit, and
wherein the readout unit reads out the file decompressed by the decompression unit by performing common processing in the case where the second determination unit determines that the file is not in the mount format and the case where the second determination unit determines that the file is in the mount format.

5. The information processing apparatus according to claim 4,
wherein the first compression unit locates a compressed file on a mount source path,
wherein the second compression unit locates a compressed file on a decompression source path,
wherein the third compression unit locates a compressed file on the decompression source path,
wherein the mount unit mounts the file of the mount source path on a mount destination path,
wherein the decompression unit acquires data by decompressing the file of the decompression source path, and locates the acquired data on a decompression destination path, and
wherein the access information is information to access data on the mount destination path.

6. The information processing apparatus according to claim 1, wherein the data is a language resource.

7. The information processing apparatus according to claim 1, wherein, in a case where the determination unit determines that the compressed data is not the file system compressed in the mount format, the decompression unit decompresses the compressed file without mounting compressed data.

8. The information processing apparatus according to claim 1, wherein the file system compressed in the mount format is a file system that is compressed in a format enabling the data to be read by being mounted when the compressed data is read.

9. An information processing method, comprising:
determining whether compressed data is a file system compressed in a mount format;
mounting the compressed data to make the compressed data readable without decompressing the compressed data in a case where it is determined that the compressed data is the file system compressed in the mount format;
decompressing a compressed file having access information to access the mounted compressed data; and
reading out the mounted compressed data using the access information of the decompressed file.

10. A non-transitory computer-readable storage medium storing a program to cause a computer to perform an information processing method, the method comprising:
determining whether compressed data is a file system compressed in a mount format;
mounting the compressed data to make the compressed data readable without decompressing the compressed data in a case where it is determined that the compressed data is the file system compressed in the mount format;

decompressing a compressed file having access information to access the mounted compressed data; and reading out the mounted compressed data using the access information of the decompressed file.

\* \* \* \* \*